Patented Oct. 24, 1922.

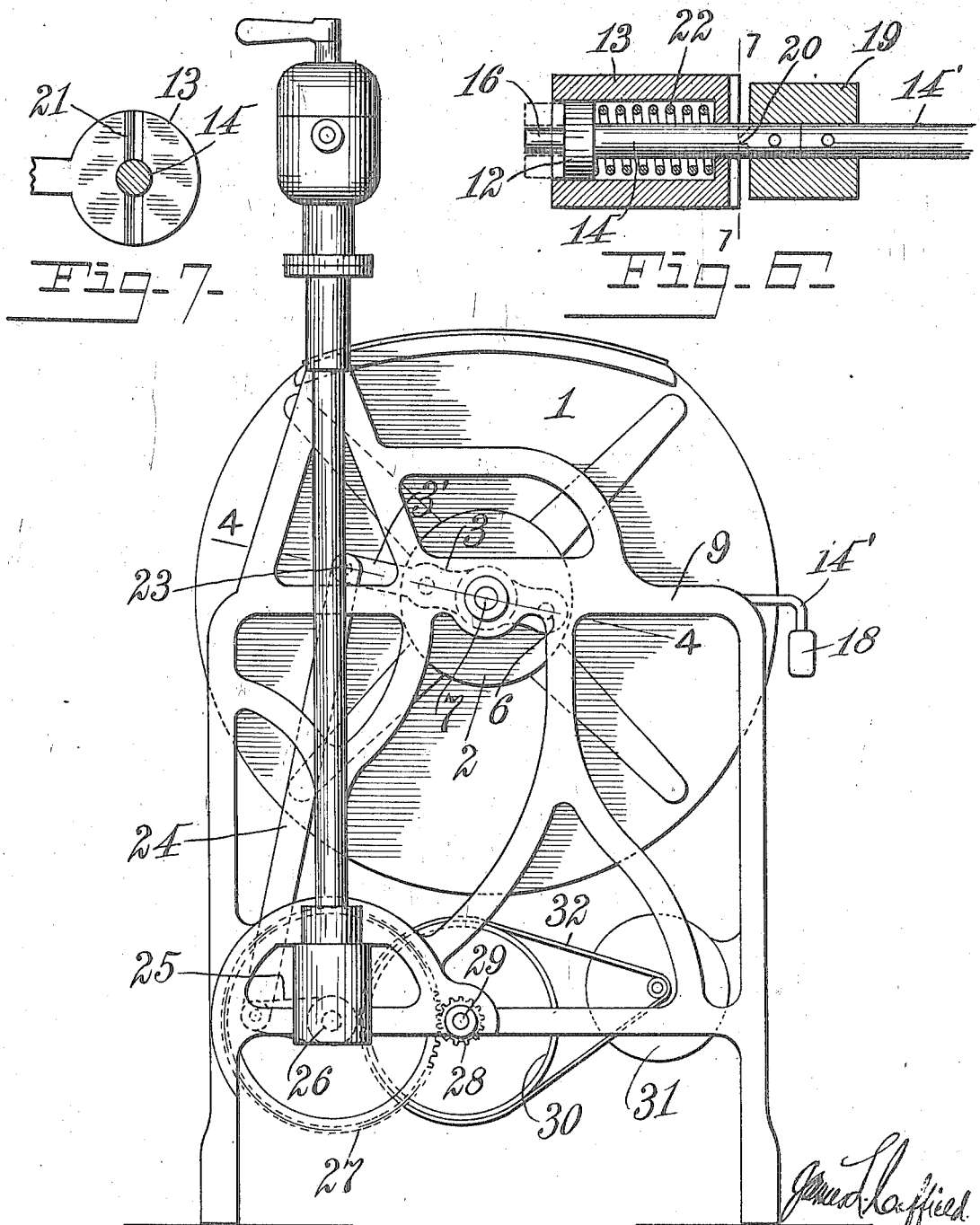

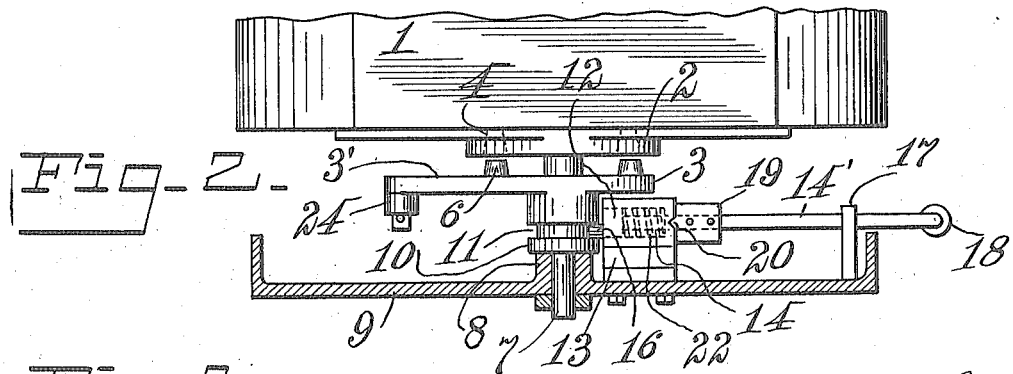
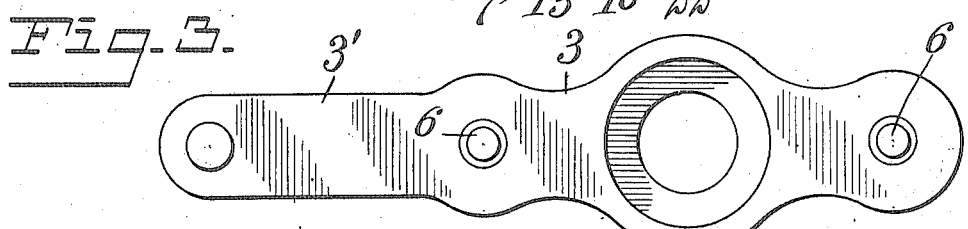
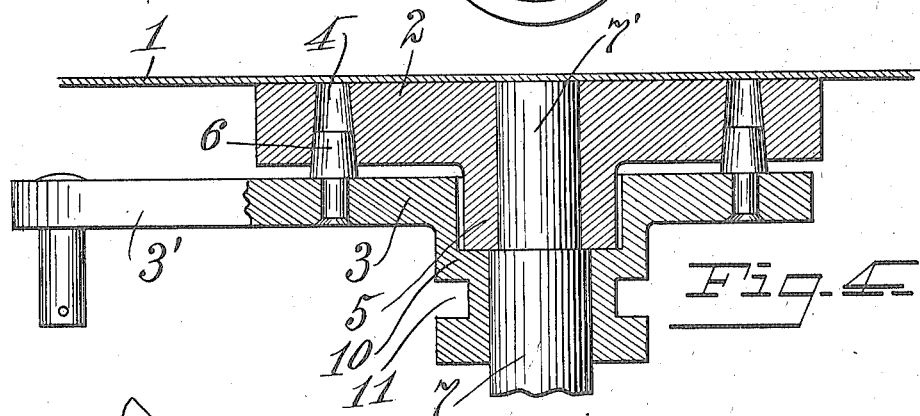

1,433,259

UNITED STATES PATENT OFFICE.

JAMES L. COFFIELD, OF DAYTON, OHIO.

CLUTCH FOR WASHING MACHINES.

Application filed May 29, 1919. Serial No. 300,619.

*To all whom it may concern:*

Be it known that I, JAMES L. COFFIELD, a citizen of the United States, residing at Dayton, in the county of Montgomery and State of Ohio, have invented certain new and useful Improvements in Clutches for Washing Machines, of which the following is a specification.

This invention relates to improvements in clutches for power-driven washing machines in which the clothes receptacle is given an oscillating movement. The clutch forms the driving connection between the oscillating clothes receptacle and the power transmission devices which are operated from the source of power, such for example, as an electric motor. Machines of this character are placed in the hands of unskilled persons, mechanically speaking, and the continued successful operation thereof it is essential to safe-guard. The clutch being a feature that is called upon to withstand much of the effect of such unskilled usage, its efficiency is liable to be seriously impaired more or less through wear and hard usage, and lost motion therein will take place as a consequence, which, if not remedied, will increase and render the machine more and more objectionable. Such being the conditions attending the operations of machines of this character, the object of the present invention is to provide means whereby any lost motion in the clutch is eliminated and any rattling or objectionable noise is avoided, as well as any danger of the breakage of parts due to said lost motion.

A further object of the present invention is to provide means for readily throwing the clutch members in and out of gear, as will hereinafter more fully appear from the description to follow in connection with the accompanying drawings.

Referring to the said drawings in general terms:

Fig. 1 is an end elevation of a power-driven domestic washing machine in which my improved clutch and clutch control devices are employed.

Fig. 2 is a top plan view of an end of the oscillating clothes receptacle in which the clutch members are shown disconnected and the clutch control device is shown controlling them in such position.

Fig. 3 is a detached plan view of the outer clutch member.

Fig. 4 is a section on the line 4—4 of Fig. 1.

Fig. 5 is a detail view of the inner clutch member.

Fig. 6 is a detail sectional view of the clutch control device.

And Fig. 7 is a detail view of a part of the clutch control device.

In a more particular description of the invention similar reference numerals will indicate the same parts in the several views of the drawings.

In the present drawings I have illustrated one embodiment of my invention and have shown the same applied to a clothes washing machine comprising an oscillatory clothes receptacle which is supported by means of suitable pintles journaled in the side members of a supporting frame. The oscillatory receptacle is connected with suitable driving mechanism through the medium of a clutch which is interposed between one of the frame members and the adjacent end of the receptacle and which, in the present construction, comprises a fixed member mounted adjacent to the end of the clothes receptacle and rigidly connected therewith and which is provided with one or more openings arranged substantially parallel with the axis of the pintle. The second clutch member is mounted on the pintle both for rotatory movement thereon and for axial movement relatively thereto and has rigidly secured thereto one or more projections adapted to be moved, by axial movement of the second clutch member into and out of the corresponding opening, or openings, in the fixed clutch member, thereby establishing a rigid driving connection between the oscillatory receptacle and the movable clutch member, which in turn is operatively connected with a suitable driving mechanism. By means of this construction I am enabled not only to provide a very compact and very strong clutch which is very simple and substantially fool-proof in its construction, and therefore peculiarly adapted to a washing machine or other machine which is operated by a person unskilled in mechanics, but to also provide a construction which is capable of withstanding the severe strains imposed thereon by the oscillation of the receptacle full of clothes and water. By providing the holes or the projections with a slight taper the clutch will automatically take up any wear to which the parts may be subjected.

In the particular embodiment of the invention here illustrated, the clothes receptacle or cylinder —1— is given an oscillating movement on its pivot bearings when the clutch members —2— and —3— are in gear. Member —2— is connected directly to an end of the cylinder and is provided with the necessary number of tapered holes —4— also a male boss —5—. The member —3— of the clutch is provided with a similar number of tapered pins —6— which enter the tapered holes —4— of member —2— when it is desired to connect the clothes receptacle —1— with the power transmission devices. Owing to the tapered form of the holes —4— and the pins —6—, and the natural resiliency of the portion of the clothes receptacle upon which clutch member —2— is mounted, a close, tight fit is always maintained when the two members of the clutch are engaged. It is desirable that the tapered holes —4— shall be of a depth greater than that of the pins —6— in order that any wear may be compensated for by a deeper penetration of the pins. The pins and the corresponding holes both being tapered, and the small ends of the pins being first to enter the large ends of the holes, the result is that the pins readily enter and soon reach the limit of their penetration at which time there is a positive fit between the pins and the holes as well as a positive bearing. The clothes receptacle —1— being formed of sheet metal the head thereof upon which one of the clutch members is mounted has a sufficient spring action to always keep the engaging parts of the clutch members, to wit, the tapered pins and holes, in perfectly tight engagement. It will be apparent that the same effect may be realized by causing a suitable spring (not shown) to exert a pressure on the outer clutch members —3—. As the clutch members are always in tight engagement when the clothes receptacle is operating, and there being no lost motion in the clutch, wear is practically eliminated as well as any resulting noises. The outer clutch member —3— has a bearing on the enlarged portion —7— of a pintle which is rigidly mounted in a boss —8— on a cross member —9— of the end frame. The said pintle also has a reduced portion —7— which enters an axial opening in the inner clutch member —2— and serves as a supporting pivot upon which said clutch member rocks. The boss —5— of the inner clutch member is received by a female boss —10— of the outer clutch member. The said boss —10— is extended to provide a peripheral groove —11— which receives a pin —16— of the clutch control device shown in Fig. 6. The said pin —16— is excentrically mounted on a head —12— which is inclosed in a housing or guide —13— which is rigidly attached to a convenient part of the frame, for example, to the cross member —9— of said frame. The said housing or guide —13— is therefore stationary or fixed in relation to the other parts.

The operating rod —14— is connected to another rod —14'— and the two in effect constitute a single rod which is supported in a bracket —17— on the adjacent part —9— of the frame of the machine. The said rod terminates in a handle —18— by which it is operated. The connection between the two rods —14— and 14'— is made by a coupling member —19— which has V-shaped projections —20— on the inner end thereof, on each side of the rod —14—. These projections —20— co-operate with similar shaped grooves —21— in the outer end of the housing —13—. When the said part —18— is turned to operate the rods —14—14'—, the V-shaped projections —20— will ride into and out of the grooves —21—. When the said projections are in said grooves the spring —22— maintains such engagement and the clutch members are held either in engagement or out of engagement, depending upon the position of the operating handle —18—. Clutch member —3— has an arm or extended portion —3'— which is coupled at —23— with a motion transmission bar —24— which in turn is connected to a crank —25— fastened on shaft —26— of a spur gear —27—. The latter gear is driven from a pinion —28— at decreased speed, said pinion being on shaft —29— of a pully —30— which is driven directly from the motor —31— through a belt —32—.

The rotary movement of the driving gear is transmitted into an oscillating movement of the clothes receptacle through the connecting clutch, and all lost motion between the members of the clutch is eliminated by the tapered clutch pins and their corresponding holes, and the natural springy character of the metal from which the clothes receptacle is made.

Having described my invention, I claim:

1. In a washing machine comprising an oscillatory clothes receptacle having a yieldable end wall, and driving means for imparting oscillatory movement to said receptacle, a clutch comprising a member secured to the yieldable end of said clothes receptacle and a second member connected with said driving means, one of said clutch members having an opening, a projection carried by the other clutch member and arranged to enter the opening in the first mentioned clutch member and to form a driving connection between the two clutch members, and means for moving one of said clutch members toward and from the other clutch member.

2. In a washing machine having an oscillatory clothes receptacle, and means for driving the same, a clutch comprising a member mounted on the end of said clothes receptacle and a second member connected with said driving means, one of said clutch members having a tapered off center opening, a tapered projection rigidly mounted on the other clutch member and adapted to enter said opening, said projection being of such size relatively to said opening that its tapered surface will engage the converging side walls of said opening with a wedging action, and means for moving said projection into and out of said opening.

3. The combination of a driven clutch member mounted on a yieldable sheet metal part of a structure to be oscillated, a driving clutch member, said clutch members being adapted to be connected through the medium of tapered openings in one and tapered projections on the other, and means for engaging and disengaging said clutch members.

4. The combination of a driven clutch member mounted on a yieldable sheet metal part of a structure to be oscillated, a driving clutch member, said clutch members being adapted to be connected through the medium of tapered openings in one clutch member and tapered projections on the other clutch member, the tapered openings being of greater depth than the tapered projections.

In testimony whereof I affix my signature.

JAMES L. COFFIELD.